United States Patent [19]
Tenney

[11] 3,870,799
[45] Mar. 11, 1975

[54] DOUGH CONDITIONING COMPOSITION AND METHOD

[75] Inventor: Ralph J. Tenney, Kansas City, Mo.

[73] Assignee: C. J. Patterson Company, Kansas City, Mo.

[22] Filed: Feb. 28, 1974

[21] Appl. No.: 446,717

[52] U.S. Cl.............. 426/62, 426/24, 426/152, 426/226, 426/331, 426/343
[51] Int. Cl............................................ A21d 2/16
[58] Field of Search....... 426/24, 62, 152, 226, 331, 426/343

[56] References Cited
UNITED STATES PATENTS
2,744,825  5/1956  Thompson et al.................. 426/24
3,433,645  3/1969  Egan et al........................... 426/24

*Primary Examiner*—James R. Hoffman
*Attorney, Agent, or Firm*—Schmidt, Johnson, Hovey & Williams

[57] ABSTRACT

A low cost method and composition for conditioning and softening bread doughs or the like to increase the volume, shelf-like, crumb texture, color, cell structure and other desirable taste and organoleptic properties of the finished wheat based baked or fried products. The method comprises incorporating into the dough prior to cooking thereof from about 0.25% to 2% (baker's weight) of a hydrated admixture containing from about 20% to 80% by weight water, an alkali or alkaline earth metal salt of the acyl lactylates of $C_{14}$–$C_{22}$ fatty acids (preferably sodium or calcium stearoyl-2-lactylate), and ethoxylated mono-and diglycerides of the $C_{14}$–$C_{22}$ fatty acids. In preferred forms, the admixture is about 50% water with the weight ratio of the lactylate component to the glyceride component being about 4:1. The active components of the admixture act in a synergistic fashion to produce equal or improved quality baked goods when compared to those containing twice as much sodium stearoyl-2-lactylate alone.

29 Claims, 2 Drawing Figures

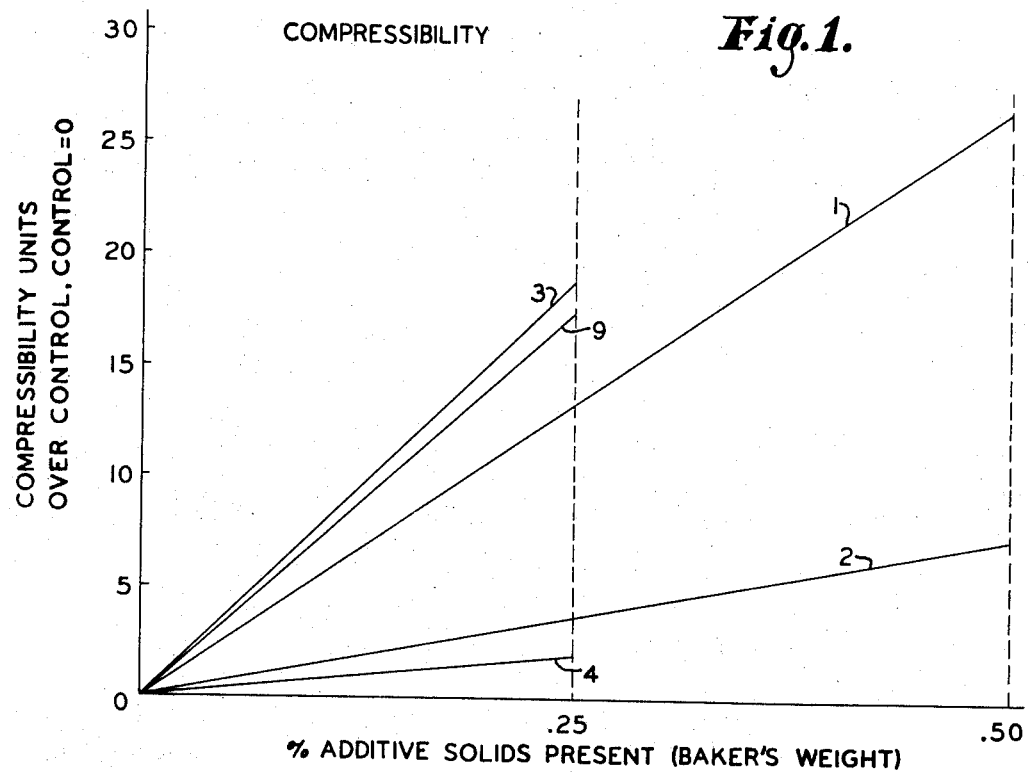
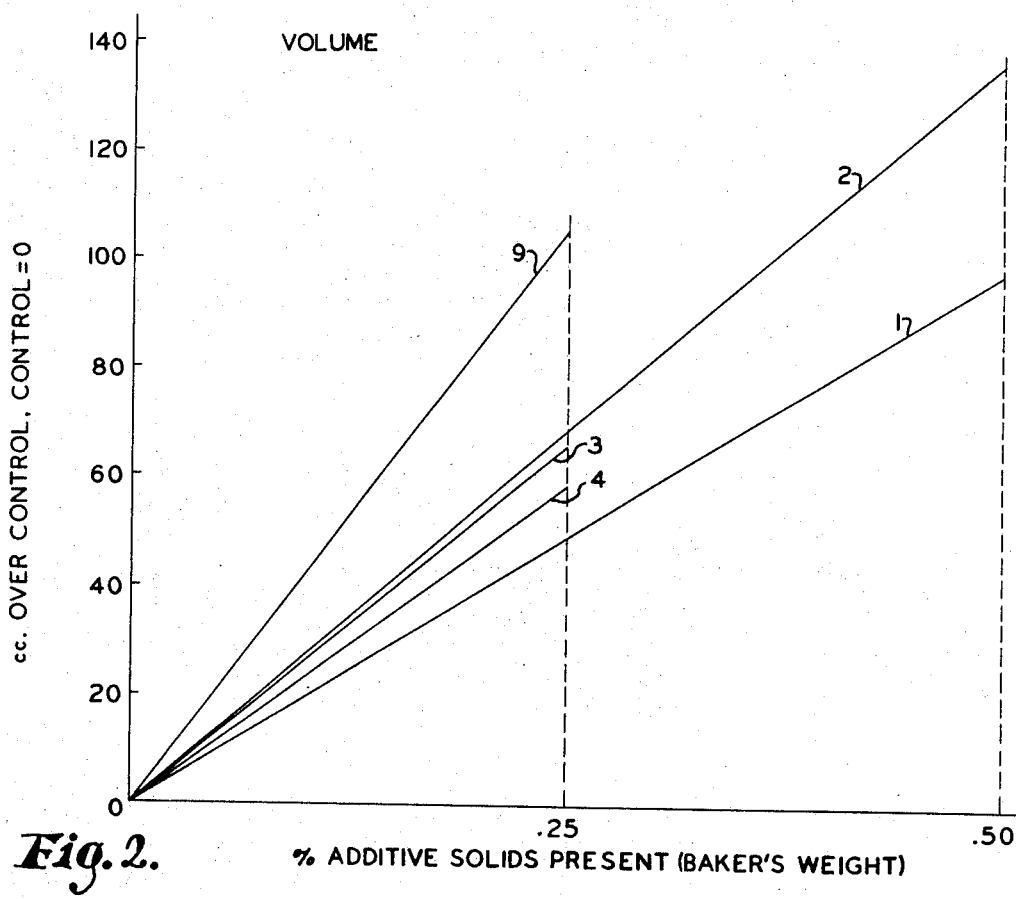

3,870,799

DOUGH CONDITIONING COMPOSITION AND METHOD

BACKGROUND

This invention relates to novel conditioning and softening agents for bread doughs and the like and a method of producing finished wheat based baked or fried goods exhibiting enhanced taste and organoleptic products by virtue of the incorporation of the conditioning and softening agents into doughs prior to cooking thereof. More particularly, the invention is concerned with hydrated conditioning and softening agents containing from about 20% to 80% by weight water, an alkali or alkaline earth metal salt of the acyl lactylates of $C_{14}-C_{22}$ fatty acids, and ethoxylated mono-and diglycerides of the $C_{14}-C_{22}$ fatty acids, and a method of incorporating such hydrated additives into wheat based doughs prior to the cooking thereof to enhance the desirable properties of the finished product.

Wheat flour baked or fried goods are staple foods in many countries of the world because of their relatively high caloric value, ready availability of wheat flour at an economical price, and the attractive organoleptic and appearance properties of the resultant food products. However, in order to increase the acceptability of wheat flour based products such as breads, it has been recognized that specific additives can advantageously be incorporated into the bread dough prior to baking thereof. In general, these additives possess emulsification properties which serve to enhance mixing characteristics, increase loaf volume and improve the texture of the finished bread, and moreover tend to produce a final product of improved taste and appearance characteristics.

Fatty acid lactylates such as calcium or sodium stearoyl-2-lactylate have been employed in bread doughs for a number of years to improve the quality thereof. The specifications for sodium stearoyl-2-lactylate (SSL) are set forth in Food Additive Regulation 21 CFR Section 121.1211 while the similar specifications for calcium stearoyl-2-lactylate (CSL) are found at Section 121.1047 of the same Regulations. The specifications for ethoxylated mono-and diglycerides (EMG) are found in Food Additive Regulation 21 CFR Section 121.1221. The desirable properties alluded to above are at least in part imparted to the finished products by incorporating into the wheat based dough prior to baking thereof, from about 0.25% to 0.5% (baker's weight) of one of the specified lactylates. "Bakers weight" as used herein refers to the well-known weight standard used in the baking industry wherein the weight percentage of dough components is based upon flour content taken as 100%. For example, 0.5% bakers weight of a given component refers to 0.5 parts by weight thereof for each 100 parts by weight flour in the dough.

However, in the use of such prior bread additives, a number of problems have arisen which have heretofore not been completely solved. More importantly, the cost of sodium or calcium stearoyl-2-lactylate and like additives is significant to bakers at levels of approximately 0.5% (baker's weight), and therefore the expense of using the same causes some commercial accounts to carefully weigh the beneficial effects produced thereby versus the cost of the additive compositions. In some instances, resistance to use of the additives at their most useful level has been encountered. Moreover, since the total solids content which can be added to bread doughs and the like in the form of additives is severely limited by federal regulations and the practicalities of bread making, it is desirable that the total solids content added to a given dough for the purposes of softening and conditioning the same be as small as possible. However, calcium and sodium stearoyl-2-lactylate and the like additives are most useful at levels of about 0.5% the like additives are most useful at levels of about 0.5% (baker's weight); otherwise, little improvement is obtained.

Therefore, there has been a need in the art for a dough conditioning and softening agent and method which produces finished products having increased loaf volumes and enhanced taste and organoleptic properties at least equivalent to those where lactylates have been added thereto, while at the same time being of lower cost and constituting only a small proportion of the total solids present in the bread dough.

SUMMARY

Accordingly, it has been discovered that a dough conditioning and softening agent of the properties described can be formulated and incorporated into uncooked doughs to good advantage. Broadly, the composition comprises a hydrated admixture containing an alkali of alkaline earth metal salt of the acyl lactylate $C_{14}-C_{22}$ fatty acids, and ethoxylated mono-and diglycerides of $C_{14}-C_{22}$ fatty acids.

In preferred forms, the weight ratio of the lactylate component to the glyceride component in the additive is from about 1:1 to 10:1 and most preferably about 4:1, with a water component of from about 20% to 80% by weight, preferably about 50% by weight. Additionally, the lactylate is most advantageously selected from the group consisting of sodium and calcium stearoyl-2-lactylates.

The hydrated additives containing the above ingredients are manufactured by simply coheating the proper proportions of the lactylate and glyceride solid components at a level of about 60° C until the lactylate component is melted. The proper proportion of heated water (above 60° C) is then added to the heated components and the entire admixture is stirred during cooling. When the admixture reaches room temperature it is in the form of a plastic solid which can be easily handled and weighed.

The preferred method involves incorporation of from about 0.25% to 2% (baker's weight) of the hydrated plastic admixture into bread or other wheat based dough prior to the cooking thereof. Preferably, the additive is present in the dough in an amount of from about 0.5% to 1% (baker's weight), and the hydrated additive composition advantageously includes a minor amount (i.e., 0.5% by weight of the additive) of a spoilage retardant such as sodium propionate.

When the additive compositions defined above are employed as conditioning and softening agents in bread doughs or the like, it has been found that enhanced appearance and organoleptic properties such as grain and texture result. Furthermore, the synergistic action of the hydrated admixture is confirmed by tests demonstrating that 0.5% (baker's weight) of the most preferred additive herein (which contains 50% water) achieves substantially equal and in some respects enhanced results when compared to the additive of 0.5% (baker's weight) of salts of stearoly lactylates. Thus, substantially equivalent results are obtained through the use of the present additives which contain only approximately one-half the solids normally employed in bread doughs when one of the lactylates is utilized alone. For the reasons outlined above, this is desirable since the total additive solids content in the bread dough is lowered, and moreover the cost of the additive is lessened since smaller quantities of such solids are employed per unit weight in the hydrated admixtures hereof.

Other advantages which inhere through the use of the compositions and methods defined herein involve improved shelf life in the resultant final products, more pleasing crumb color and texture, and in general softer and more tender breads and the like exhibiting increased loaf volumes.

Furthermore, incorporation of the additives into the dough is facilitated by virtue of the hydrated nature of the improving and conditioning agent. Specifically, because the additive products are hydrated they can be added to the yeast brew or to the sponge or dough fractions during conventional bread making procedures, or to the fat phase in continuous bread making processes. Accordingly, the somewhat slow admixing of dry solids which characterizes the use of calcium and sodium stearoyl-2-lactylate and like compounds is avoided in the present method with consequent savings in time and money to the baker.

IN THE DRAWINGS

FIG. 1 is a graphical representation showing the degree of compressibility of bread doughs treated with compositions in accordance with the present invention, compared to similar levels of addition of the separate components of the additives thereof.

FIG. 2 is a graphical representation showing the comparative loaf volume of doughs treated with the additive compositions in accordance with the invention, compared to loaves treated with like amount of the individual components of compositions of this invention.

DETAILED DESCRIPTION

The following examples will serve to illustrate the preferred softening and dough conditioning agents of the present invention, as well as the method of use thereof; however, such examples are not to be taken as limitations upon the overall scope of the invention, but as merely illustrations of the same.

EXAMPLE I

The following standard laboratory bake shop formula and procedures were employed for the evaluation of various breads employing a number of different additives. The standard control bread was produced by the sponge-dough method outlined below.

The following sponge ingredients were admixed to produce the sponge fraction of the overall dough:

TABLE I

| Sponge Ingredients | Grams | Percentage Based On Total Flour |
|---|---|---|
| Bakers Patent Flour | 490.00 | 70.00% |
| Water (based on sponge flour) | 294.00 | 42.00 |
| Yeast (Compressed) | 17.50 | 2.50 |
| Yeast Food (Arkady) | 5.25 | 0.75 |
| Shortening | 14.00 | 2.00 |

The yeast was presoaked for 30 minutes in a part of the sponge water at 80° F., to form a suspension. This suspension and the balance of the water was then added to the other sponge ingredients and mixed 3 minutes at 44 rpm using a Hobart A-200 mixer equipped with a Model CT-W-200 bowl and fork (National Manufacturing Co.). The bowl was water jacketed to maintain constant temperature control throughout the mixing step. The sponge was then set at 80° F., transferred at a trough 10 ⅝ inches by 5 inches top inside, 10 ½ inches by 4 ½ inches bottom outside and 5 inches deep, and fermented for 4 ½ hours in a cabinet maintained at 83° F. and 80% relative humidity.

The following ingredients were employed in the dough fraction:

TABLE II

| Dough Ingredients | Grams | Percentage Based On Total Flour |
|---|---|---|
| Bakers Patent Flour | 210 | 30.00% |
| Water (Farinograph + 4%)* | 133 to 168 | 22.00 |
| Sugar (Dextrose) | 49 | 7.00 |
| Salt | 14 | 2.00 |
| Non-Fat Dry Milk Solids | 14 | 2.00 |

*Absorption variations are due to variable requirements of flours, determined by the Farinograph The dough ingredients were added to the fermented sponge and mixed 2 minutes at 44 rpm, fully developed at 88 rpm and set at 80° F. The mixing equipment utilized was the same specified for the sponge. The time of the development stage of mixing depends on the mixing requirements of the flour was determined from the Farinograph peak time and usually ranged between 5 and 9 minutes, depending on the mixing strength of the flour. The developed dough was then returned to the trough and given 45 minutes floor time in a cabinet maintained at 83° F. and 80% relative humidity.

The dough was then hand scaled into two 19 ounce dough pieces and mechanically rounded in a conventional type rounder and placed in a cabinet drawer for ten minutes to simulate conventional overhead proof. After overhead time, the dough pieces were hand flattened as a pre-sheeting operation and molded on a conventional type, cross-grain molder. The molder head rolls were set for 0.429 inch clearance between the top rolls and 0.127 between the bottom rolls. The dough pieces were then placed in one pound bread pans having a pan factor of 2.25 square inches to an ounce of dough. The pans measured 10 ¼ inches by 4 ⅝ inches top inside, 9 ½ inches by 3 ⅞ inches bottom outside and 3 inches deep.

The panned dough was then proofed to volume as determined by a gauge, one half inch above the top of the pans, in a cabinet maintained at 105°F. and 85% relative humidity. After final proof the panned dough was baked in a gas fired oven for 20 minutes at 435° F. After baking, the two loaves of bread resulting from each test dough were depanned and placed 2 inches apart on wire racks to cool for 45 minutes. When the cooling cycle was completed, loaf volumes were measured by the rape seed displacement method and the loaves were stored in moisture resistant plastic bags for 48 hours at room temperature.

After the storage period, the two loaves of bread resulting from each test dough were placed in a miter box and sliced into 2 inch sections. Compressibility measurements of three sections were made using a Universal Pentrometer fitted with a cylindrical plunger 3 centimeters in diameter and weighing 265 grams. The plunger was adjusted to touch, but not to press, the crumb surface of each section of bread, and the weight was released for 10 seconds, locked and a deformation reading taken from a dial calibrated in 0.1 millimeters. Three sections of each loaf (excluding heels) were used and the six compressibility readings were averaged for each test dough. Softer loaves are indicated by higher compressibility valves.

The bread was then assigned a quality rating score ranging from 82 to 87 based on volume, symmetry, crust color, break and shred, crumb color, grain texture, and eating quality. A score of 85 or above is considered premium quality. In this connection, small differences in quality scores can be significant if the data covers a significant number of bakes and the trends are constant.

In order to determine the properties of breads containing hydrated additives in accordance with the present invention, as well as those containing only one of the active solid ingredients thereof, the following test was undertaken. First, a series of 11 loaves were produced in accordance with the above outlined method. In each case various levels of such additives were incorporated into the bread dough by simply admixing the same into the dough fraction prior to baking of the bread. The following additives were employed in the 11 separate runs.

In the case of compositions 1 and 2 above, the defined ingredients were simply incorporated into the bread dough in the well known manner prior to baking thereof (EMG is an oily viscous liquid and SSL is a powdered solid). With respect to compositions 3 and 4, hot water was added to the listed components and allowed to cool while stirring in order to form a hydrated plastic mass. Compositions 5 through 10 were produced by heating the solid sodium stearoyl-2-lactylate and the viscous glyceride components at 60° C. until the lactylate melted, followed by addition of 60° C. water thereto. The admixture was thereafter cooled with continuous stirring whereupon a plastic solid was formed.

In order to test the comparative compressibility, loaf volume and quality score of each of the loaves treated with the eleven listed additives, the procedures given above were followed to measure compressibility, volume and quality. Table IV hereunder details the results obtained from such tests with each of the additives listed in Table III:

TABLE IV

BAKING RESULTS OBTAINED USING COMPOSITIONS 1-11 OF TABLE III

| Additive Composition | Level Baked* | "Additive Solids" Contributed | Crumb Compressibility | Loaf Volume | Relative Quality Score |
|---|---|---|---|---|---|
| 1 | 0.5% | 0.5% | 179 | 2933 | 85.1 |
| 2 | 0.5% | 0.5% | 159 | 2969 | 84.9 |
| 3 | 0.5% | 0.25% | 171 | 2901 | 84.7 |
| 4 | 0.5% | 0.25% | 153 | 2894 | 84.8 |
| 5 | 0.5% | 0.25% | 159 | 2919 | 85.0 |
| 6 | 0.5% | 0.25% | 162 | 2910 | 84.8 |
| 7 | 0.5% | 0.25% | 162 | 2888 | 85.0 |
| 8 | 0.5% | 0.25% | 164 | 2884 | 84.8 |
| 9 | 0.5% | 0.25% | 170 | 2940 | 85.3 |
| 10 | 0.5% | 0.25% | 169 | 2915 | 85.0 |
| 11 | No additive-control | | 152 | 2835 | 84.3 |

* based on the flour weight

TABLE III

COMPOSITIONS FOR EXPERIMENTAL BAKING

| Components | Composition Identification (%) | | | | | | | | | | |
|---|---|---|---|---|---|---|---|---|---|---|---|
| | 1 | 2 | 3 | 4 | 5 | 6 | 7 | 8 | 9 | 10 | 11 |
| Sodium Stearoyl-2-Lactylate | 100 | — | 50 | — | 20 | 25 | 30 | 35 | 40 | 45 | — |
| Ethoxylated Mono-and diglycerides (EMG) | — | 100 | — | 50 | 30 | 25 | 20 | 15 | 10 | 5 | — |
| Sodium Propionate | — | — | 0.5 | 0.5 | 0.5 | 0.5 | 0.5 | 0.5 | 0.5 | 0.5 | — |
| Water | — | — | 49.5 | 49.5 | 49.5 | 49.5 | 49.5 | 49.5 | 49.5 | 49.5 | — |

As can be appreciated from a study of the foregoing table, additive composition number 1 consisting of 0.5% (baker's weight) of sodium stearoyl-2-lactylate gave good results in each category. However, referring specifically to additive composition 9 which is the most preferred form of the present invention, it will be seen that 0.5(baker's weight) thereof gives substantially equal results and in two categories (loaf volume and quality), actually exceeded the results found in the use of sodium stearoyl-2-lactylate alone. This is especially significant when it is taken into account that additive composition 9 provides only 0.25% (baker's weight) of additive solids to the dough, while composition 1 contributes twice as much additive solids thereto. Furthermore, the results with respect to additive composition 2 are likewise significant since that composition is simply the EMG component of the instant compositions in accordance with the present invention. Therefore, it is clear that a synergistic result obtains through the use of a hydrated admixture of the lactylate and EMG components as defined herein, and that substantially equivalent or better results are obtained through the use of an amount thereof which contributes only one-half the amount of additive solids present in equal quality loaves of bread containing either of the individual components of the composition.

TABLE V

| Components | Composition Identification, (%) | | | | | | | |
|---|---|---|---|---|---|---|---|---|
| | 12 | 13 | 14 | 15 | 16 | 17 | 18 | 19 |
| Sodium Stearoyl-2-Lactylate and Ethoxylated Mono-and Diglyceride (Ratio of SSL to EMG 4:1) | 80 | 70 | 60 | 50 | 40 | 30 | 20 | — |
| Sodium Propionate | 0.5 | 0.5 | 0.5 | 0.5 | 0.5 | 0.5 | 0.5 | — |
| Water | 19.5 | 29.5 | 39.5 | 49.5 | 59.5 | 69.5 | 79.5 | — |

Similarly, while composition 3 (hydrated sodium stearoyl-2-lactylate, 0.25% total solids) gives essentially equal compressibility results with respect to composition 9, the latter imparts to the finished bread a markedly improved loaf volume over composition 3. Therefore, in overall bread improvement, the hydrated additives give as good as or measurably better results than heretofore possible through the use of prior dough additives.

In order to more clearly illustrate the synergistic action of the improved additive compositions hereof, reference is specifically made to FIGS. 1 and 2 of the drawings. As shown therein with respect to FIG. 1, the compressibility factor of the loaves containing 0.25% solids (baker's weight) of preferred composition 9, exhibit substantially enhanced compressibility ratings when compared to equal amounts of either of the individual components thereof, while being only about one-half as expensive and contributing only half as much solids as compositions 1 and 2. Furthermore, additive 9 of the present invention is equal or superior to compositions 3 and 4 which are the hydrated lactylate and glyceride components, respectively. Accordingly, the synergistic action of the hydrated admixtures described herein is conclusively established.

Moreover, comparative loaf volume results even more forcefully indicate the synergistic action of the present additives when compared to the individual components thereof, both dry and hydrated. As can be seen in the graphical representation of FIG. 2, bread containing 0.5% (baker's weight) of composition 9 (which amounts to 0.25% baker's weight additive solids) are far superior to equal solid levels of all of the comparative additives tested.

EXAMPLE II

A series of bread doughs were made in conformity with the methods outlined above in Example I, and treated with hydrated additive compositions produced by combining sodium stearoyl-2-lactylate and EMG, with the water level thereof being varied from between about 20% to 80% by weight. This test was undertaken to demonstrate the fact that the water level thereof has very little effect on the additive and its performance in doughs.

In particular, the following additive compositions were formulated in accordance with the methods set out above:

Each of the additive compositions identified above (12–19) were incorporated in nine separate doughs in order to test the effect thereof on compressibility, loaf volume, and relative quality of the finished bread product. In each case, the additive level added in baker's weight was varied in order to incorporate an equivalent amount of solids into the dough matrix in each instance. The average results obtained from each of additive compositions 12–19 are collected in Table VI hereunder.

TABLE VI

BAKING RESULTS OBTAINED USING COMPOSITIONS 12–19 OF TABLE V (Average of 9 Doughs)

| | Additive Level* | Crumb Compressibility | Loaf Volume | Relative Quality Score |
|---|---|---|---|---|
| 12 | 0.3175% | 164 | 2931 | 84.7 |
| 13 | 0.3571% | 162 | 2900 | 84.6 |
| 14 | 0.4167% | 170 | 2920 | 84.8 |
| 15 | 0.5% | 170 | 2922 | 84.8 |
| 16 | 0.625% | 167 | 2953 | 84.7 |
| 17 | 0.833% | 165 | 2936 | 84.7 |
| 18 | 1.25% | 166 | 2947 | 84.6 |
| 19 No Additive Control | | 146 | 2861 | 83.7 |

*based on baker's weight; (level used treated each dough with an equivalent amount of additive solids).

Table IV demonstrates that essentially equivalent bread improvement was obtained over the "no additive control" breads in connection with all of the test compositions. Therefore, the effectiveness of the hydrated additive compositions hereof is essentially constant over a broad range of water content as long as comparable additive solid levels are maintained in comparative treated breads.

It is to be noted however, that the relative amount of water in the hydrated additive compositions disclosed herein does effect the handling characteristics thereof. In particular, the firmness of the hydrated additives increases as the water level is decreased, as would be expected. It has been found that compositions containing less than about 20% water are so firm as to be difficult to handle during scaling operations, and that compositions containing more water than about 80% by weight are too fluid to facilitate easy handling.

EXAMPLE III

In order to test the effectiveness of calcium stearoyl-2-lactylate as a component in the additive compositions disclosed herein, the following experiment was undertaken.

In accordance with the method outlined above, an additive composition was formulated containing 40% by weight calcium stearoyl-2-lactylate, 10% ethoxylated mono-and diglycerides, 0.5% sodium propionate, and 49.5% water.

This composition was tested for effectiveness at two different additive levels (0.25% and 0.5% baker's weight) against a "no additive control". The results of these tests involving incorporation of the additive compositions into three separate doughs were averaged and are collected in Table VII hereunder:

TABLE VII

BAKING RESULTS USING CALCIUM STEAROYL-2-LACTYLATE COMBINED WITH EMG (Average of 3 Doughs)

| | Additive Level* | Crumb Compressibility | Loaf Volume | Relative Quality Score |
|---|---|---|---|---|
| Test Composition | 0.25% | 167 | 2904 | 84.3 |
| Test Composition | 0.5% | 171 | 2954 | 84.8 |
| No additive control | — | 155 | 2884 | 84.3 |

*Baker's weight

The data in Table VII demonstrates the functionality of calcium stearoyl-2-lactylate as the lactylate portion of the additive compositions of the present invention. In particular, hydrates containing this lactylate are substantially identical in use and effect to those compositions containing sodium stearoyl-2-lactylate, and accordingly these lactylates are preferred for use in the additive compositions disclosed herein.

EXAMPLE IV

The additive compositions of this invention were further tested against a commercial additive (identified herein by designation "X") which comprised a hydrated blend of mono- and diglycerides and polyoxyethylene (ethoxylated) sorbitan monostearate. The most preferred additive (composition 9 in Example I) was incorporated into test doughs at various levels of use and comparative doughs were prepared with similar levels of commercial additive X. Baking tests in accordance with the above examples were also undertaken to confirm the effectiveness of the additive compositions disclosed herein as compared to the described commercial additive. The additive composition labeled "22" in Table VIII below comprised a hydrated admixture made in accordance with the methods outlined above and containing 40% by weight sodium stearoyl-2-lactylate, 7.5% ethoxylated mono- and diglycerides, and 0.5% sodium propionate, with the balance being water. For comparative purposes, additive composition 22 and commercial additive X were employed at various levels in three separate doughs, baked on five different days, and the results were averaged. Doughs were formulated containing 0.5% ( baker's weight) of sodium stearoyl-2-lactylate. A series of no-additive-control runs were also carried out.

The results obtained from the experiment outlined above are tabulated in Table VIII hereunder:

The results above substantiate that the additive compositions disclosed herein produce softer bread, as measured by crumb compressibility, at significantly lower levels of use than commercial additive X. It is to be noted that although SSL at a level of 8 ounces per 100 pounds of flour produced the softest bread in these tests, this occured only because the additive solids contributed by the SSL were significantly greater than that present in any of the other tests involving use of the combined additive composition hereof.

Most importantly however, the results of Table VIII show unmistakably that the additive composition hereof produces much better breads than the commercial additive tested. In particular, comparative compressibility, loaf volume and relative quality scores are all markedly improved through the use of the additive compositions of this invention, as compared to the commercial additive and the control.

Sodium and calcium stearoyl-2-lactylates are described in the Food Chemicals Codex, Second Edition, 1972 (National Academy of Sciences, Washington, D.C. ) at pages 160 and 770, and can be prepared by admixing lactic acid in an aqueous medium with commercial stearic acid (an admixture of myristic, palmitic and stearic fatty acids) at a sufficiently elevated temperature to remain in a molten condition. Specific procedures for producing the lactylates of which the number 2 indicates the average number of lactyl groups on the molecule, are set forth in detail in U.S. Pat. No. 2,789,992 insofar as SSL ester is concerned and Pat. No. 2,733,252 which describes not only the preparation of SSL from stearic acid, sodium bicarbonate and lactylic acid, but also sets forth the parameters for production of the calcium lactylate composition. The latter two patents, as far as the disclosure thereof is relevant to the production of the lactylates hereof, are expressly incorporated by reference herein.

Ethoxylated mono- and diglycerides are described in the Food Chemicals Codex, Second Edition, 1972, published by the National Academy of Sciences, Washington, D. C. In particular, EMG comprises a mixture of stearate, palmitate and lesser amounts of myristate partial esters of glycerin which are produced by a condensation reaction with approximately 20 moles of ethylene oxide per mole of alpha-monoglyceride reaction mixture. The resultant product has an average molecular weight of 535 (plus of minus 10%). It occurs as a pale, slightly yellow colored, oily liquid or semi-gel having a faint, characteristic odor and a mildly bitter taste. It is soluble in water, alcohol and xylene, and partially soluble in mineral and vegetable oil. An acceptable method for the production of such glycerides is set

TABLE VIII

COMPARATIVE BAKING RESULTS OF COMBINATION OF SSL AND EMG VERSUS ADDITIVE X (Average of Three Doughs, Baked on Five Different Days)

| Additive Employed | Additive Level %* | Additive Level, Ounces** | Compressibility 0.1 mm Second Day | Loaf Volume cc. | Relative Quality Score |
|---|---|---|---|---|---|
| 22 | 0.375 | 6 | 152 | 2966 | 85.20 |
| 22 | 0.5 | 8 | 161 | 2970 | 85.33 |
| 22 | 0.625 | 10 | 170 | 3023 | 85.66 |
| 22 | 0.75 | 12 | 172 | 2981 | 85.76 |
| Additive X | 0.5 | 8 | 151 | 2973 | 85.00 |
| Additive X | 0.625 | 10 | 154 | 2969 | 84.96 |
| Additive X | 0.75 | 12 | 157 | 2963 | 84.98 |
| Additive X | 0.875 | 14 | 158 | 2930 | 84.70 |
| Additive X | 1.0 | 16 | 159 | 2903 | 84.76 |
| Sodium Stearoyl-2-Lactylate | 0.5 | 8 | 175 | 2977 | 85.40 |
| Control | — | — | 139 | 2882 | 84.20 |

* Based on the total flour weight as 100%
** The level in ounces per 100 pounds of flour.

forth in U.S. Pat. No. 3,490,819, and especially Example I thereof. The latter patent is also incorporated by reference insofar as it deals with methods of producing the glyceride components for the compositions and methods disclosed herein.

Having thus described the invention, what is claimed as new and desired to be secured by Letters Patent is:

1. A conditioning and softening agent for incorporation into wheat based doughs which comprises a hydrated additive containing a member selected from the group consisting of the alkali and alkaline earth metal salts of the acyl lactylates of $C_{14}$–$C_{22}$ fatty acids, and a member selected from the group consisting of the ethoxylated mono- and diglycerides of $C_{14}$–$C_{22}$ fatty acids, the weight ratio of said lactylate component to said glyceride component in said additive ranging from about 1:1 to 10:1.

2. An agent as set forth in claim 1 wherein said additive includes from about 20% to 80% by weight of water.

3. An agent as set forth in claim 1 wherein said lactylate is selected from the group consisting of sodium stearoyl-2-lactylate and calcium stearoyl-2-lactylate.

4. An agent as set forth in claim 3 wherein said lactylate is sodium stearoyl-2-lactylate.

5. An agent as set forth in claim 3 wherein said lactylate is calcium stearoyl-2-lactylate.

6. An agent as set forth in claim 3 wherein the water content thereof is about 50% by weight, and the weight ratio of lactylate to said glyceride component is about 4:1.

7. An agent as set forth in claim 1 wherein is included a spoilage retarding agent.

8. An agent as set forth in claim 7 wherein said spoilage retarding agent comprises about 0:5% of sodium propionate.

9. In combination with a wheat based dough formulation, a conditioning and softening agent incorporated therein in an amount of from about 0.25% to 2% (baker's weight) and comprising a hydrated additive containing a member selected from the group consisting of the alkali and alkaline earth metal salts of the acyl lactylates of $C_{14}$–$C_{22}$ fatty acids, and a member selected from the group consisting of the ethoxylated mon-and diglycerides of $C_{14}$–$C_{22}$ fatty acids, the weight ratio of said lactylate component to said glyceride component in said additive ranging from about 1:1 to 10:1.

10. The combination as set forth in claim 9 wherein said lactylate is selected from the group consisting of sodium stearoyl-2-lactylate and calcium stearoyl-2-lactylate.

11. The combination as set forth in claim 10 wherein said lactylate is sodium stearoyl-2-lactylate.

12. The combination as set forth in claim 10 wherein said lactylate is calcium stearoyl-2-lactylate.

13. The combination of claim 9 wherein said additive is provided with from about 20% to 80% of water.

14. The combination as set forth in claim 13, wherein the water content of said additive is about 50% by weight, and the weight ratio of sodium stearoyl-2-lactylate to said glyceride component is about 4:1.

15. The combination as set forth in claim 9 wherein said dough is a bread dough formulation.

16. The combination as set forth in claim 15 wherein said agent is present in said bread dough in an amount of about 0.5% to 1% (baker's weight).

17. The combination as set forth in claim 9 wherein a spoilage retardant is included in said additive.

18. The combination as set forth in claim 17 wherein sodium propionate is present in said additive as said spoilage retardant in an amount of about 0.5% by weight, based upon the total weight of the additive.

19. A method of conditioning and softening wheat based doughs which comprises the step of:
incorporating into said dough prior to cooking thereof from about 0.25% to 2% (baker's weight) of a conditioning and softening agent which comprises a hydrated additive containing a member selected from the group consisting of the alkali and alkaline earth metal salts of the acyl lactylates of $C_{14}$–$C_{22}$ fatty acids, and a member selected from the group consisting of the ethoxylated mono- and diglycerides of $C_{14}$–$C_{22}$ fatty acids, the weight ratio of said lactylate component to said glyceride component in said additive ranging from about 1:1 to 10:1.

20. The method of claim 19 wherein is included the step of providing about 20% to 80% of water in said additive.

21. The method of claim 20 wherein is included the step of employing an additive having a water content of about 50% by weight, with the weight ratio of lactylate to said glyceride component being about 4:1.

22. The method of claim 19 wherein is included the step of employing a lactylate in said additive selected from the group consisting of sodium stearoyl-2-lactylate and calcium stearoyl-2-lactylate.

23. The method of claim 22 wherein is included the step of employing sodium stearoyl-2-lactylate as said lactylate.

24. The method of claim 22 wherein is included the step of employing calcium stearoyl-2-lactylate as said lactylate.

25. The method of claim 19 wherein is included the step of providing a spoilage retardant in said additive.

26. The method of claim 25 wherein is included the step of adding about 0.5% by weight, based upon the total weight of the additive, of sodium propionate as said spoilage retardant.

27. A method of formulating a conditioning and softening agent for incorporation into doughs, comprising the steps of:
heating together a member selected from the group consisting of the alkali and alkaline earth salts of the acyl lactylates of $C_{14}$–$C_{22}$ fatty acids, and a member selected from the group consisting of the ethoxylated mono- and diglycerides of $C_{14}$–$C_{22}$ fatty acids, at reaction conditions of time and temperature sufficient to melt the lactylate component;
adding hot water to the heated admixture; and
cooling the admixture with continuous agitation until the latter forms a plastic solid.

28. The method of claim 27 wherein is included the step of employing a member selected from the group consisting of sodium or calcium stearoyl-2-lactylate as said lactylate component, the ratio of said lactylate component to said glyceride component ranging from about 1:1 to 10:1.

29. The method of claim 28 wherein said ratio is 4:1, and sufficient water is employed such that said conditioning and softening agent is from about 20% to 80% by weight water.

* * * * *